United States Patent
Zacharias, Jr. et al.

[15] 3,697,936
[45] Oct. 10, 1972

[54] SOUND VELOCIMETER
[72] Inventors: Ellis M. Zacharias, Jr., Ridgewood; Uldis Cirulis, Midland Park, both of N.J.
[73] Assignee: Nusonics, Inc., Paramus, N.J.
[22] Filed: Feb. 27, 1970
[21] Appl. No.: 15,003

[52] U.S. Cl............340/3 E, 73/194 A, 181/0.5 AP, 340/5 S, 340/8 FT
[51] Int. Cl..............................................G01s 9/66
[58] Field of Search.............340/3, 3 E, 5, 5 S, 8 FT; 181/0.5 AP; 73/194 A

[56] References Cited
UNITED STATES PATENTS

| | | |
|---|---|---|
| 3,100,885 | 8/1963 | Welkowitz et al............340/3 |
| 3,482,647 | 12/1969 | Lynch et al..................181/0.5 |
| 3,341,808 | 9/1967 | Levin et al..................340/5 S |

OTHER PUBLICATIONS

Dulberger, Electronics, Vol. 34, No. 22, June 2, 1961, pp. 41–43.
Tshiegg et al, Journal Acous. Soc. America, Vol. 31, No. 7, July 1959, pp. 1,038–1,039.

Primary Examiner—Richard A. Farley
Attorney—Samuelson & Jacob

[57] ABSTRACT

A sound velocimeter for measuring the velocity of sound in a fluid wherein the oscillator frequency is adjusted depending upon the relative position in time of the received signal with respect to the transmitted signal.

7 Claims, 8 Drawing Figures

PATENTED OCT 10 1972

INVENTOR.
ELLIS M. ZACHARIAS, JR.
ULDIS CIRULIS
BY
Gunnelson & Jacob
THEIR ATTORNEYS

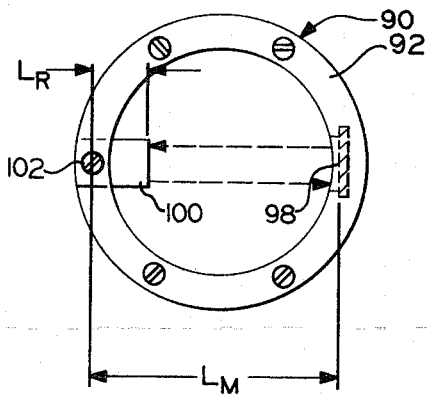
Fig_6
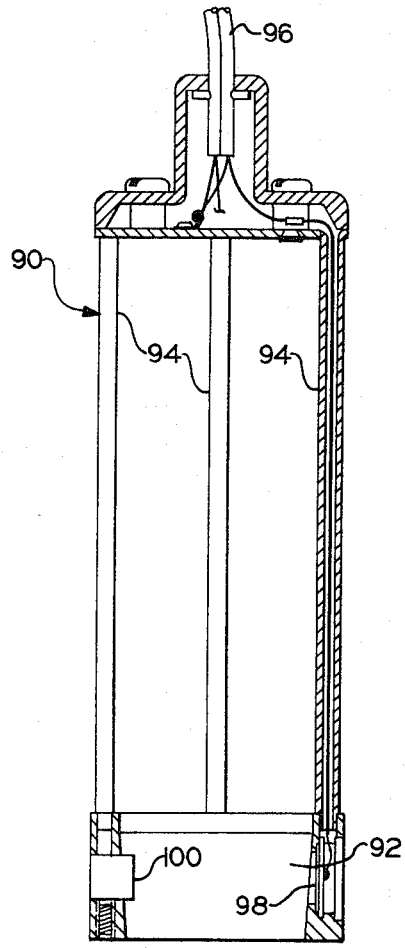
Fig_7
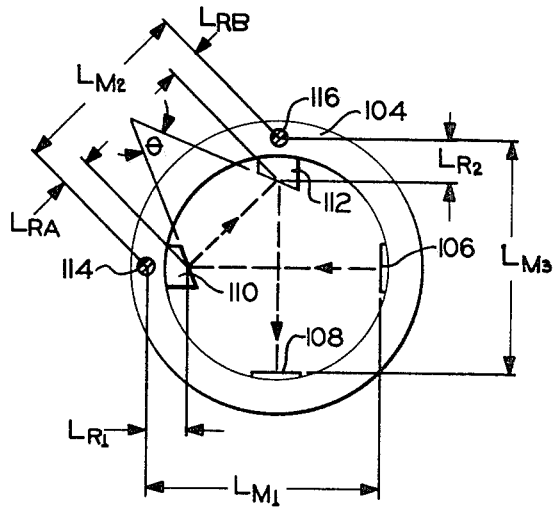
Fig_8
INVENTOR.
ELLIS M. ZACHARIAS JR.
ULDIS CIRULIS
BY
Samuelson & Jacob
THEIR ATTORNEYS

SOUND VELOCIMETER

The invention relates to sound velocimeters for measuring the velocity of sound in a fluid which may utilize either a single electroacoustic transducer for both transmitting and receiving or two electroacoustic transducers, one for transmitting and one for receiving. More particularly, the invention is directed toward such velocimeters which utilize phase locking to control the frequency of the transmitter oscillator depending upon the position in time of the received pulse with respect to the transmitted pulse.

The velocimeter of the invention utilizes the phase lock principle wherein a sound pulse is transmitted through the medium, generally a fluid (either gas or liquid), and the phase detector detects the position in time of the received pulse with respect to the transmitted pulse. The phase lock adjusts the frequency of the oscillator so that the received signal is received at a predetermined point in time with respect to the transmitted signal. The sound velocity in the medium is measured by the frequency of the oscillator.

It is an important object of the invention to provide a velocimeter which provides a flywheel effect with greater electrical and acoustical noise immunity and less susceptibility to sudden, abnormal changes in solution such as bubbles, solid or liquid particles passing through the sound path.

It is a further object of the invention to provide a velocimeter which utilizes a higher frequency for the same sound path length than may be utilized with prior art, sing-around velocimeter.

It is yet another object of the invention to provide a velocimeter wherein the transmit pulse does not occur at the time of arrival of a received pulse to thereby permit measurement of the received signal amplitude without interference by the transmitted pulse.

It is a still further object of the invention to provide a velocimeter wherein the transmitted pulse amplitude is automatically adjusted to compensate for changes in the acoustic attenuation in the sound path.

It is a still further object of the invention to provide such a velocimeter which may utilize a single transducer for both transmission and reception.

It is a still further object of the invention to provide a velocimeter wherein the transmit pulse amplitude is directly proportional to the acoustic absorption of the fluid medium.

These and other objects, advantages, features and uses will be apparent during the course of the following description when taken in conjunction with the accompanying drawings wherein:

FIG. 6 is a plan view of a probe, used with sound velocimeters of the invention, which may be used in beakers or similar vessels for measuring the velocity of sound in static fluids;

FIG. 7 is an elevational view, partly in section, of the probe of FIG. 6; and

FIG. 8 is a view similar to that of FIG. 6 of an alternative embodiment of probe which may be used for insertion in beakers or similar vessels for measuring the velocity of sound in static fluids.

Figure 1:
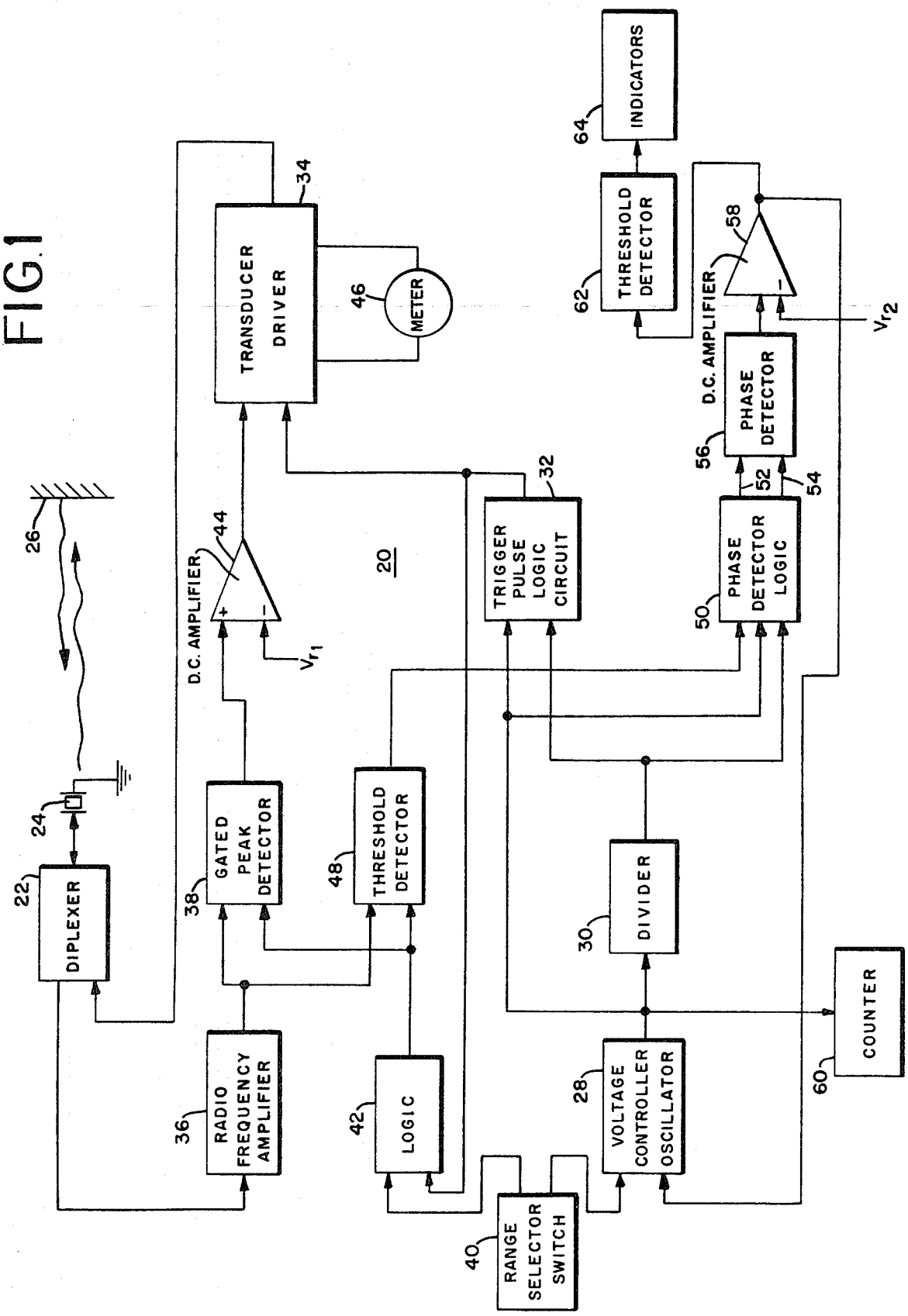
FIG. 1 is a block diagram of a sound velocimeter of the invention.

In the drawings, wherein, for the purpose of illustration, are shown various embodiments of the invention and wherein like numerals designate like parts throughout the same, the numeral 20 designates a preferred electronic system used with velocimeters of the invention as shown in FIGS. 1 and 1A. Diplexer 22 is connected to transducer 24 which transmits sound signals through the medium to reflector 26 and receives sound signals therefrom. Free running voltage controlled oscillator 28 operates at a frequency which is consistent with the sound path length, the sound propagation velocity through the fluid and the counter divider ratio. The output of the oscillator is connected to the input of divider 30 which is a divide by $2^n$ counter where $n$ is any positive integer greater than 1. Preferably, $n$ is 3 so that the output of oscillator 28 is divided by 8.

The output of divider 30 is connected to trigger pulse logic circuit 32 which generates an output pulse at the eighth pulse count from divider 30. The output of circuit 32 is connected to transducer driver 34 which applies an excitation signal to transducer 24 through diplexer 22. Diplexer 22 serves to prevent the full amplitude of the transmit pulse from being applied to amplifier 36. Since the received pulse is of low amplitude, the diplexer back biases driver 34 and prevents it from loading down the received pulse. In effect, it prevents amplifier 36 from being overloaded during the duration of the transmit pulse and it prevents the received pulse from being loaded down by the driver 34.

The transducer 24 is of the reversible type, namely, when it is excited with an electrical signal, it produces a corresponding sound signal and when it is excited with a sound signal, it generates a corresponding electrical signal. Preferably, transducer 24 is a disc of the polarized, electrostrictive, ceramic type which operates in thickness mode. However, other types of transducers which operate in other modes may also be used.

The sound signal, which is reflected back to transducer 24 from reflector 26, has traversed the medium twice and is converted into a received electrical signal by transducer 24. This electrical signal, which corresponds to the sound signal received by the transducer, is fed from diplexer 22 to radio frequency (r-f) amplifier 36. The output of amplifier 36 is connected to one input of gated peak detector 38.

The frequency of oscillator 28 is set manually, in the first instance, by range selector switch 40 which is also connected to logic 42. Where range changing is not desired, the range selector switch may be eliminated. The output of logic 42 is connected to a second input of gated peak detector 38. Gated peak detector 38 is only on just before a pulse is received to avoid its detecting a transmit pulse. The gated peak detector 38 is disabled during period "T" following the transmit pulse. "T" must be shorter than the acoustic transit time so that the peak detector will be operable when the acoustic pulse is received. The detector is disabled during "T" to prevent spurious acoustic reflections or electronic noise transients from triggering a transmit pulse. Ideally "T" is slightly greater than half the acoustic transit time. If it is less than half the transit time, the velocimeter may be triggered by spurious reflections and operate at twice its fundamental frequency.

The output of the gated peak detector 38 is applied to an input of d-c amplifier 44 and is compared against a reference voltage $V_{r1}$ and then produces a voltage output proportional to the amplitude of the received pulse. This voltage is applied to the transducer driver 34 and serves to control the amplitude of the pulse transmitted by the driver 34 to diplexer 22.

Preferably, a display such as a meter 46 is connected to driver 34. Its display measures the transmitted pulse amplitude which is proportional to the absorption of sound in the medium. The greater the transmitted pulse amplitude is, the greater the absorption is because a stronger signal is needed to overcome the attenuation in the medium.

The output of amplifier 36 is also connected to an input of threshold detector 48, a second input of which is connected to the output of logic 42. Threshold detector 48 is of the gated type, it is disabled when peak detector 38 is disabled and it produces an output pulse when the amplified, received pulse is applied to its input. The output of threshold detector 48 is fed to an input of phase detector logic 50. Other inputs of phase detector logic 50 are connected to the output of oscillator 28 and the output of divider 30. Phase detector logic 50 detects the position of the received pulse relative to the position in time of the transmitted pulse. In this illustrative case, with an eight pulse count, the preferably position for the received pulse is the seventh pulse count. If other pulse counts are used, other positions for the received pulse may be preferable.

The output of phase detector logic 50 produces a "retard" signal (line 52) or an "advance" signal (line 54) which is applied to the input of phase detector 56. The output of phase detector 56 is applied to d-c amplifier 58 and is compared to a reference voltage $V_{r2}$. If the applied voltage is greater than the reference voltage (advance), the output voltage increases. If it is less (retard), the output voltage decreases. The output of amplifier 58 is connected to oscillator 28 and serves to readjust the frequency of oscillator 28 so that the received signal is locked onto the seventh pulse count of oscillator 28. Circuits 50, 56 and 58 together produce a d-c output which is proportional to the phase difference between the received signal and, in this illustrative case, the seventh pulse count.

It is also feasible to provide a phase lock system in which the output of the phase detector logic 50 is always an "advance" signal and the phase detector 56 varies the magnitude of the "advance" signal to keep the frequency of oscillator 28 adjusted.

Since the frequency of the oscillator 28 is controlled by the time position of the received signal, its frequency is a function of the velocity of sound in the medium. The output of oscillator 28 is also connected to counter 60 which measures the frequency of oscillator 28 and is calibrated so that it measures the velocity of sound in the medium.

If it is desirable to obtain a visual indication of the condition of the phase detection circuits, a threshold detector 62 is connected to the output of amplifier 58 and indicators 64 (such as lamps) are connected to threshold detector 62. If the circuit is advancing the frequency of oscillator 28, one lamp lights and if it is retarding, another lamp lights. Other indicator configurations may also be used. For example, if the phase detector produces only an "advance" signal of varying amplitude, then one lamp would light when an "advance" signal was present and the other one would light when no "advance" signal was present.

Velocimeters of the invention may be utilized for measuring the velocity of sound in fluids flowing in a pipe (process) or in fluids in a beaker or similar vessel (static). The measurement of the sound velocity in the fluid is employed to determine the characteristics of the fluid, e.g., its salinity, its concentration, its composition, etc. Velocimeters of the invention may be of either the single transducer type or the two transducer type. In the previous discussion of the velocimeter circuit, the use of a single transducer was described. However, if separate transmitting and receiving transducers are used, the transmitting transducer is connected to the output of driver 34 and the receiving transducer is connected to the input of amplifier 36. In such a case, diplexer 22 is not required.

Figure 2:
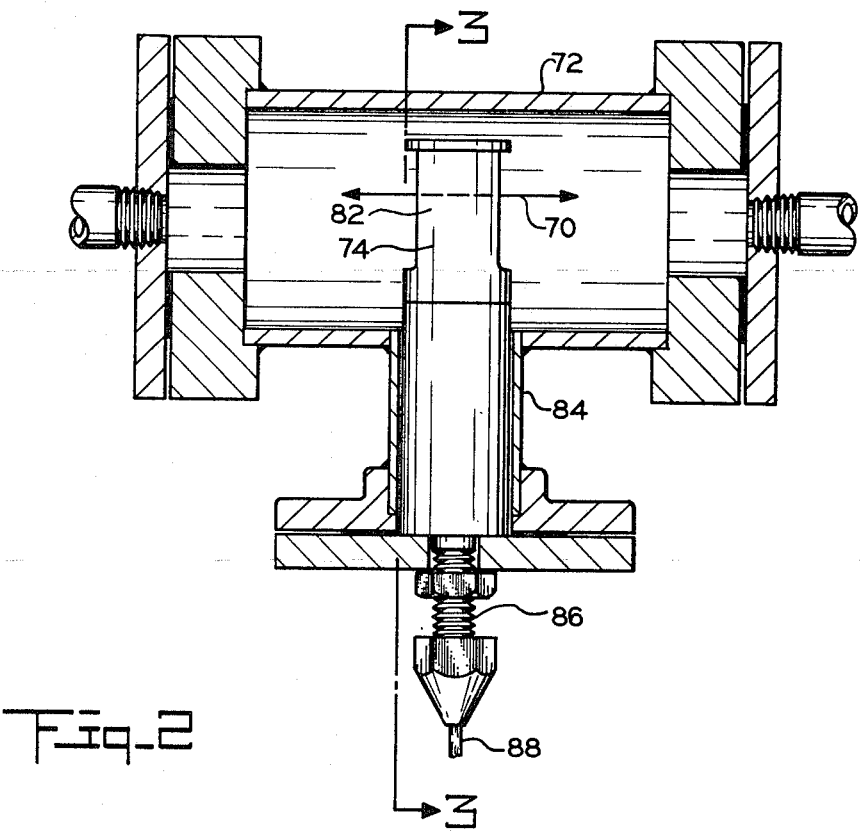
FIG. 2 is an elevational view, partly in section, of a probe, used with sound velocimeters of the invention, installed in a pipe for measuring the velocity of sound in fluids moving in the pipe.
Figure 3:
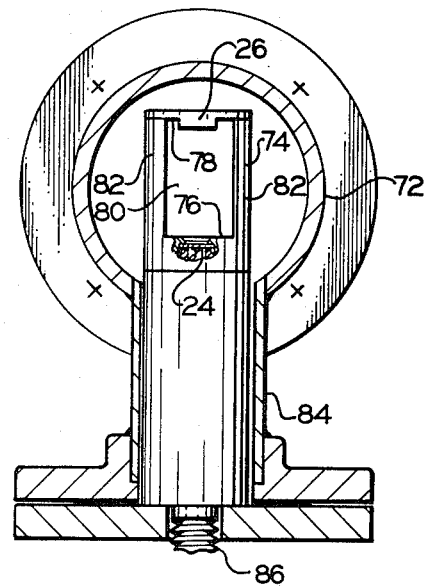
FIG. 3 is a sectional view, taken on the lines 3—3 of FIG. 2, viewed in the direction of the arrows.
Figure 4:
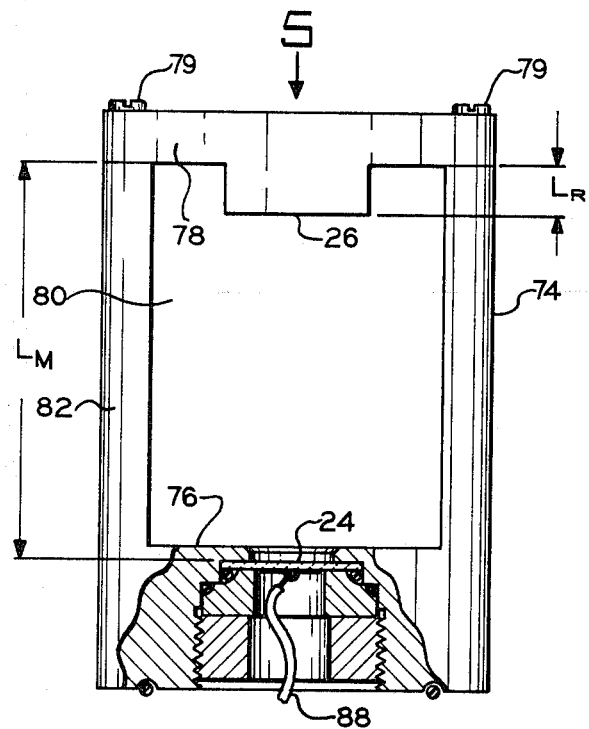
FIG. 4 is an elevational view of the probe of FIGS. 2 and 3.

In FIGS. 2 through 5 there is illustrated a single transducer probe for measuring the velocity of sound in a fluid flowing in a pipe. The fluid may flow in either of the directions indicated by the arrowheads of line 70. Pipe insert 72 is connected in the flow circuit, preferably as shown in FIGS. 2 and 3.

Mounting 74 is substantially cylindrical in shape and has two bases 76 and 78 and a wall 82 having openings 80 therein to permit the fluid to flow therethrough. Base 78 is held in place with respect to mounting 74 by means of screws 79. Transducer 24 is mounted in base 76 in a manner well-known in the art so that its face is in contact with the fluid to thereby facilitate the transmission of the sound energy into the fluid. Preferably, transducer 24 is disc-shaped and vibrates in its thickness mode.

Figure 5:
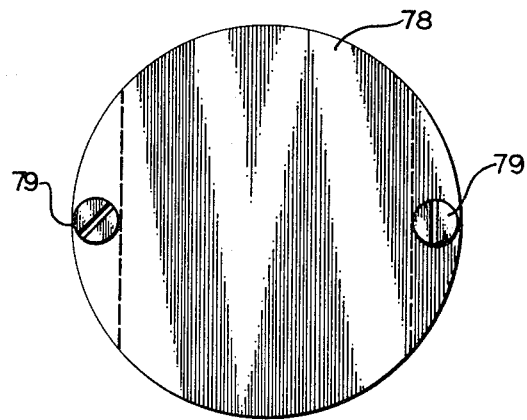
FIG. 5 is a plan view of the probe of FIG. 4, viewed in the direction of arrow 5 of FIG. 4.

To maintain the sound path length constant, reflector 26 is a part of the base 78 as shown in FIG. 5. Reflector 26 is made of a material having a higher coefficient of thermal expansion than that of the mounting wall and base 76. For example, the material of which mounting 74 is formed may be Invar steel plated with corrosion resistant material such as nickel or chromium, having a coefficient of thermal expansion of $1 \times 10^{-6}$ in/in/° C, and the reflector material may be type 316 stainless steel, having a coefficient of thermal expansion of $16 \times 10^{-6}$ in/in/° C.

If the distance between the front face of base 78 and the face of transducer 24 is designated as $L_M$ and the distance between the face of reflector 26 and the front face of base 78 is designated as $L_R$, the distance between the face of reflector 26 and the face of transducer 24 will remain constant if $L_M \alpha_M = L_R \alpha_R$ where: $\alpha_M$ is the coefficient of thermal expansion of the mounting material and $\alpha_R$ is the coefficient of thermal expansion of the reflector material.

FIGS. 6 and 7 illustrate a single transducer probe for use in measuring the sound velocity of static fluids such as in beakers or similar vessels. Probe 90 comprises a ring 92 and a set of legs 94 to which ring 92 is affixed. The electrical lead 96 is carried within one of the hollow legs 94 as shown in FIG. 7. Transducer 98 is similar to transducer 24 and reflector 100 is similar to reflector 26. Set screw 102 is provided to set the position of reflector 100 with respect to transducer 98. If the distance between the front face of transducer 98 and set screw 102 is designated $L_M$ and the distance between set screw 102 and the face of reflector 100 is designated $L_R$, the distance between the face of transducer 98 and the face of reflector 100 will remain constant if $L_M \alpha_M = L_R \alpha_R$ where $\alpha_M$ is the coefficient of thermal expansion of the ring material and $\alpha_R$ is the coefficient of thermal expansion of the reflector material.

FIG. 8 is a plan view of a two transducer probe for insertion in beakers or similar vessels for use with velocimeters of the invention. The supporting structure and legs are similar to those shown in FIG. 7 except that two electrical leads are brought out, one from each transducer.

The ring 104 should be formed of material of lower coefficient of thermal expansion than the reflectors and the length of the sound path from transducer 106 to transducer 108 will remain constant if $(L_{M1} + L_{M2} + L_{M3})\alpha\alpha_M = (L_{R1} + L_{R2} + L_{RA} + L_{RB})\alpha_R$ where:

$\alpha_M$ = coefficient of thermal expansion of the ring
$\alpha_R$ = coefficient of thermal expansion of the reflectors
$L_{M1}$ = distance between the face of transducer 106 and set screw 114 which adjusts the position of reflector 110
$L_{M2}$ = distance between set screw 114 and set screw 116 which adjusts the position of transducer 112
$L_{M3}$ = distance between set screw 116 and the face of transducer 108
$L_{R1}$ = distance between set screw 114 and the center of the face of reflector 110
$L_{R2}$ = distance between set screw 116 and the center of the face of reflector 112
$L_{RA} = L_{R1} \cos \theta$ where $\theta$ is the total angle between the reflector faces
$L_{RB} = L_{R2} \cos \theta$ where $\theta$ is the total angle between the reflector faces The foregoing relationships are also valid for maintaining a constant sound path length in a two transducer probe which is installed in a pipe for measuring sound velocity in a fluid moving in a pipe.

While particular embodiments of the invention have been shown and described, it is apparent to those skilled in the art that modifications are possible without departing from the spirit of the invention and the scope of the subjoined claims.

The embodiments of the invention in which an exclusive property or privilege is claimed are defined as follows:

1. A velocimeter for measuring the velocity of sound in a fluid having at least one electroacoustic transducer and at least one reflector immersed in the fluid and placed such that the length of the sound path between the transducer and the reflector and return is fixed comprising:
    a free running oscillator;
    a divider-counter connected to the free running oscillator to produce a plurality of pulses;
    a trigger pulse logic circuit connected to the divider-counter to count the pulses and to generate a pulse when a predetermined pulse count is attained;
    a driver connected to the output of the trigger pulse logic circuit and the electroacoustic transducer such that when a pulse is received from the trigger pulse logic circuit an electrical pulse (transmit pulse) is applied to the transducer, the transducer converting the electrical pulse to a corresponding sound pulse which is transmitted to the reflector and returned therefrom to the transducer, the sound signal received by the transducer being converted into a corresponding electrical signal (received pulse);
    an r-f amplifier connected to the transducer to amplify the corresponding electrical signal;
    a gated peak detector connected to the r-f amplifier and adjusted so that it is on just prior to receiving the corresponding electrical signal;
    a d-c amplifier connected between the output of the gated peak detector and the driver to adjust the output amplitude of the driver in accordance with the amplitude of the received pulse;
    a threshold detector connected to the output of the r-f amplifier and adjusted such that it is on just prior to receiving the received pulse;
    a phase detector connected to the output of the threshold detector to detect the position of the received pulse in time with respect to the transmit pulse and to produce a d-c output proportional to the phase difference between the transmit pulse and the received pulse;
    the output of the phase detector being connected to the free running oscillator to thereby apply a voltage to the oscillator and change its frequency such that the received pulse will be applied to the phase detector a predetermined count prior to the generation of the pulse by the trigger pulse logic circuit.

2. The invention of claim 1 wherein the phase detector comprises:
    a phase detection logic circuit for detecting the position in time of the received pulse and for producing a signal dependent on such time position;
    a detecting circuit connected to the phase detection logic circuit such that its output amplitude is proportional to the difference in time between the received pulse and the signal generated by the trigger pulse logic circuit;
    a phase detection d-c amplifier connected to the output of the detecting circuit and to the free running oscillator.

3. The invention of claim 2 including a phase lock threshold detector for detecting the amount of voltage applied to the free running oscillator by the phase detection d-c amplifier and a display connected thereto to show the voltage being applied.

4. The invention of claim 3 including a range selector connected to the free running oscillator for adjusting the frequency thereof and a logic circuit connected between the range switch and the threshold detector for controlling the operation thereof.

5. The invention of claim 4 including an absorption indicator connected to the driver for displaying the absorption in the fluid by measuring the amplitude of the pulse transmitted by the driver which is proportional to absorption of sound in the fluid.

6. The invention of claim 1 including a range selector connected to the free running oscillator for adjusting the frequency thereof and a logic circuit connected between the range switch and the threshold detector for controlling the operation thereof.

7. The invention of claim 1 including an absorption indicator connected to the driver for displaying the absorption in the fluid by measuring the amplitude of the pulse transmitted by the driver which is proportional to absorption of sound in the fluid.

* * * * *